(12) United States Patent
Droigk et al.

(10) Patent No.: US 11,600,872 B2
(45) Date of Patent: Mar. 7, 2023

(54) BATTERY SYSTEM AND METHOD FOR THE HOMOGENEOUS TEMPERATURE DISTRIBUTION INSIDE THE BATTERY SYSTEM

(71) Applicant: Robert Bosch GmbH, Stuttgart (DE)

(72) Inventors: Thorsten Droigk, Tuebingen (DE); Enno Lorenz, Budapest (HU); Tim Dettling, Murr (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 17/255,178

(22) PCT Filed: Aug. 28, 2019

(86) PCT No.: PCT/EP2019/072937
§ 371 (c)(1),
(2) Date: Dec. 22, 2020

(87) PCT Pub. No.: WO2020/043767
PCT Pub. Date: Mar. 5, 2020

(65) Prior Publication Data
US 2021/0273277 A1 Sep. 2, 2021

(30) Foreign Application Priority Data
Aug. 30, 2018 (DE) .......................... 102018214722.1

(51) Int. Cl.
| | |
|---|---|
| *H01M 10/06* | (2006.01) |
| *H01M 10/617* | (2014.01) |
| *H01M 10/625* | (2014.01) |
| *H01M 10/6563* | (2014.01) |
| *H01M 50/244* | (2021.01) |
| *H01M 50/271* | (2021.01) |
| *H01M 10/44* | (2006.01) |
| *H01M 10/42* | (2006.01) |

(52) U.S. Cl.
CPC ....... *H01M 10/617* (2015.04); *H01M 10/443* (2013.01); *H01M 10/625* (2015.04); *H01M 10/6563* (2015.04); *H01M 50/244* (2021.01); *H01M 50/271* (2021.01); *H01M 2010/4271* (2013.01)

(58) Field of Classification Search
CPC .. H01M 10/617; H01M 10/613; H01M 10/61; H01M 10/625; H01M 10/62; H01M 10/6563; H01M 10/6561; H01M 50/244; H01M 50/249; H01M 50/271; H01M 10/443; H01M 10/441; H01M 2010/4271
See application file for complete search history.

(56) References Cited

U.S. PATENT DOCUMENTS

| | | | |
|---|---|---|---|
| 2003/0198864 A1 | 10/2003 | Vigier et al. | |
| 2011/0020676 A1 | 1/2011 | Kurosawa | |
| 2013/0149583 A1* | 6/2013 | Kurita | H01M 50/20 429/120 |
| 2017/0069888 A1* | 3/2017 | Uchida | H01M 50/20 |

FOREIGN PATENT DOCUMENTS

EP  3125355 A1  2/2017

OTHER PUBLICATIONS

International Search Report for PCT/EP2019/072937, dated Nov. 26, 2019.

* cited by examiner

*Primary Examiner* — Raymond Alejandro
(74) *Attorney, Agent, or Firm* — Norton Rose Fulbright US LLP; Gerard Messina

(57) ABSTRACT

A battery system, including a battery housing, which includes a base body, a first cover element, and a second cover element. The first cover element closes a first open end face of the base body, and the second cover element closes a second open end face of the base body. The battery system also includes a battery cell holder, which includes a plurality of battery cells, the battery cell holder being situated inside the battery housing, and a battery management system which is configured to monitor the plurality of battery cells and to detect temperatures of the individual battery cells. At least one blower is situated inside the battery housing, and the at least one blower being activated by the battery management system as a function of the temperature of the individual battery cells exceeding a threshold value.

9 Claims, 4 Drawing Sheets

BATTERY SYSTEM AND METHOD FOR THE HOMOGENEOUS TEMPERATURE DISTRIBUTION INSIDE THE BATTERY SYSTEM

FIELD

The present invention relates to a battery system and to a method for the homogeneous temperature distribution inside the battery system.

BACKGROUND INFORMATION

Batteries for mobile applications generally include a plurality of battery cells. These battery cells are limited with respect to the voltage and the permissible currents. To achieve an overall voltage and an overall capacity of the battery necessary for a predefined application, the individual battery cells are interconnected in a certain manner. A series interconnection increases the necessary overall voltage, and a parallel interconnection increases the necessary overall capacity as well as the permissible overall current.

To achieve a preferably high energy density, individual battery cells are situated closely together in a battery cell array. During operation, each individual battery cell has a certain power loss. This power loss is released in the form of waste heat into the interior of the battery housing. Since the waste heat in different locations of the battery may be dissipated differently well to the surroundings, an inhomogeneous temperature distribution arises inside a closed battery housing.

A disadvantage in the process is that the power of the battery as well as its service life are impaired.

The individual battery cells may only be safely operated up to a certain temperature. The individual battery cells thus must not exceed this particular temperature, neither for the charging process nor for the discharging process, to ensure the safety of the battery. If the particular temperature is reached by a battery cell during the discharging process, the discharge current of the battery is restricted. If the battery is in the charging mode, the charging process is only started when the instantaneous temperature of the battery cells is below the particular temperature.

Due to the inhomogeneous temperature distribution, only individual battery cells are within the range of the limiting temperature of the permissible operation, while other battery cells have moderate operating temperatures. The battery management system, however, restricts the power of the entire battery as soon as one battery cell is in the critical range of the limiting temperature.

A disadvantage in the process is that an early restriction of the battery power occurs.

The operating temperature also plays an important role for the service life of a battery cell. The aging of a battery cell occurs very quickly at high operating temperatures. Due to the inhomogeneous temperature distribution inside the closed battery housing, the battery cells which have a lower operating temperature age considerably more slowly than battery cells which have a high operating temperature. Since the battery cells in such a battery cell array are not replaced or replaceable, the entire battery is decommissioned as soon as a certain number of battery cells have reached the end of their life. At this point in time, however, all other or further battery cells may still be safely operated for a certain time.

Various types of cooling are conventional for overcoming these disadvantages. In most cases, an air cooling or a liquid cooling is used in the process. For this purpose, air is taken in from the surroundings with the aid of a fan and is conducted across the battery cells. The taken-in air is heated in the process by the waste heat of the individual battery cells and, after passing the battery cell array, exits the battery housing again through an outlet opening. The heat is, thus, released to the surroundings.

U.S. Patent Application Publication No. US 2003198864 A1 describes an electrochemical battery which includes a battery housing including a plurality of battery cells and a central blower. With the aid of the blower, an air flow is generated between an air inlet opening of the battery housing and an air outlet opening of the battery housing, which is conducted across the battery cells, by which the battery cell temperature is regulated.

U.S. Patent Application Publication No. US 2013149583 A1 describes a battery system including a plurality of electrical cells, a battery housing, and a blower. An area of the battery housing situated beneath the battery cells includes an inlet opening for air. The side walls as well as an area of the battery housing above the battery cells have outlet openings for the air.

The disadvantage in both documents is that inlet openings and outlet openings for the air have to be inserted into the battery housing. A further disadvantage is that the battery housing thus becomes uptight.

It is an object of the present invention to overcome these disadvantages.

SUMMARY

In accordance with an example embodiment of the present invention, a battery system includes a battery housing including a base body, which includes a first cover element and a second cover element. The first cover element closes a first open end face of the base body. The second cover element closes a second open front face end face of the base body. In other words, the battery housing is closed in an air-tight manner with respect to the surroundings. The battery system includes a battery cell holder, which includes a plurality of battery cells, the battery cell holder being situated inside the battery housing, and a battery management system, which is configured to monitor the plurality of battery cells and detect temperatures of the individual battery cells. According to the present invention, at least one blower is situated inside the battery housing, the at least one blower being activated by the battery management system as a function of the temperature of the individual battery cells exceeding a threshold value. In other words, the temperature redistribution takes place inside the closed battery housing by a circulating air movement of the heat arising in the battery or the battery system.

An advantage in the process is that the waste heat arising due to the operation of the battery cells is homogeneously redistributed inside the battery, and the homogeneously distributed heat is released by the housing surface to the surroundings, so that the individual battery cells age uniformly, and a restriction of the battery power only occurs after an extended operating time. This means a heating of all battery cells at an average speed, instead of a rapid heating of the battery center and a slow heating in the edge regions.

Moreover, an improved temperature distribution or a rapid cooling of the battery causes the battery to quickly enter a chargeable state. It is furthermore advantageous that no openings for the inlet and the outlet of a cooling fluid are required. Moreover, neither evaporators nor condensers are required, whereby the overall system has a lower weight and is cost-effective. The battery system is thus also suitable for small battery applications, such as 48 V systems.

In one refinement of the present invention, the at least one blower is situated between the battery housing and the battery cell holder.

It is advantageous in the process that the arrangement is installation space-neutral compared to a battery housing including a battery cell holder without blower, since the blower is situated in a free space between the battery housing and the battery cell holder.

In one further embodiment of the present invention, the at least one blower is situated on the battery cell holder.

An advantage in the process is that the design of the battery cell holder does not have to be modified.

In one refinement of the present invention, the at least one blower is designed in the form of a radial blower.

An advantage in the process is that the blower may be situated in a targeted manner in temperature-critical locations of the battery.

In one further embodiment of the present invention, the second cover element includes at least one further blower. In other words, the at least one further blower is situated on the second cover element inside the battery housing.

An advantage in the process is that the at least one further blower, in terms of installation space, is only limited by the size of the second cover element. It is thus possible to generate large volume flows.

In one refinement of the present invention, the base body is a continuously cast element.

It is advantageous in the process that the battery housing is manufactured in a simple and cost-effective manner.

In one further embodiment of the present invention, the battery housing includes metal, in particular aluminum.

An advantage in the process is that the homogeneously distributed heat inside the battery housing may be dissipated very quickly to the outside, i.e., outside the battery housing, by the thermally conductive surface of the base body.

An example method according to the present invention for the homogeneous temperature distribution inside a battery system, the battery system including a battery housing, a battery cell holder including a plurality of battery cells, the battery cell holder being situated inside the battery housing and including a battery management system which is configured to monitor the plurality of battery cells and detect the temperature differences between the individual battery cells, includes that at least one blower inside the battery housing is activated by the battery management system as a function of the temperature differences between the individual battery cells.

The use according to the present invention of the battery system according to the present invention takes place in an electric vehicle, in particular, an electrically operated two-wheeler.

A vehicle according to the present invention, in particular, an electrically operated two-wheeler, includes the battery system according to the present invention.

Further advantages are derived from the following description of exemplary embodiments and the figures.

BRIEF DESCRIPTION OF THE DRAWINGS

The present invention is described hereafter based on preferred specific embodiments and the figures.

DETAILED DESCRIPTION OF EXAMPLE EMBODIMENTS

Figure 1:
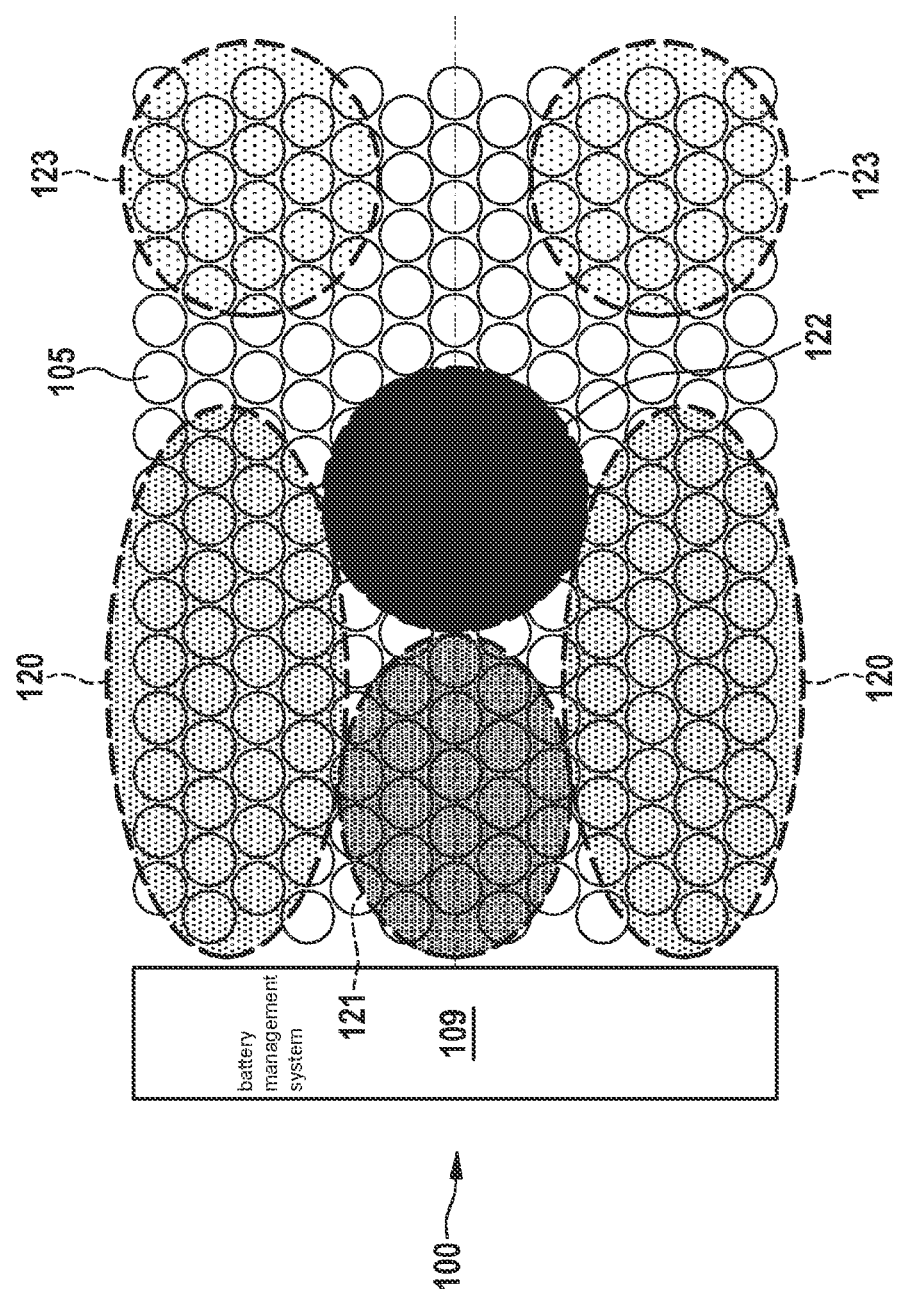
FIG. 1 shows a top view onto a temperature distribution of a battery system including a plurality of battery cells which are interconnected in series and in parallel to one another, in accordance with an example embodiment of the present invention.

FIG. 1 shows a top view onto an exemplary temperature distribution of a battery system 100 supplying 48 V, including a plurality of battery cells 105. The battery system includes thirteen rows of fifteen battery cells 105 each, which are connected in parallel to one another and form a battery cell array. In the process, each battery cell 105 supplies a voltage of approximately 3.6 V so that the battery is able to supply an overall voltage of 48 V. Due to the close arrangement of battery cells 105, different temperature areas arise inside the battery housing, which is not shown in FIG. 1, during operation of battery system 100 as a result of the waste heat released by the individual battery cells. By way of example, first temperature areas 120, a second temperature area 121, a third temperature area 122, and fourth temperature areas 123 are shown in FIG. 1. First temperature areas 120 have a lower temperature than second temperature area 121 and third temperature area 122. Fourth temperature areas 123 are the coldest. The reason for this is that battery cells 105 situated at the edge of the battery cell array are able to release the waste heat to the battery housing more quickly than battery cells 105 situated in the interior of the battery cell array. Battery management system 109 additionally acts as a heat source.

Figure 2:
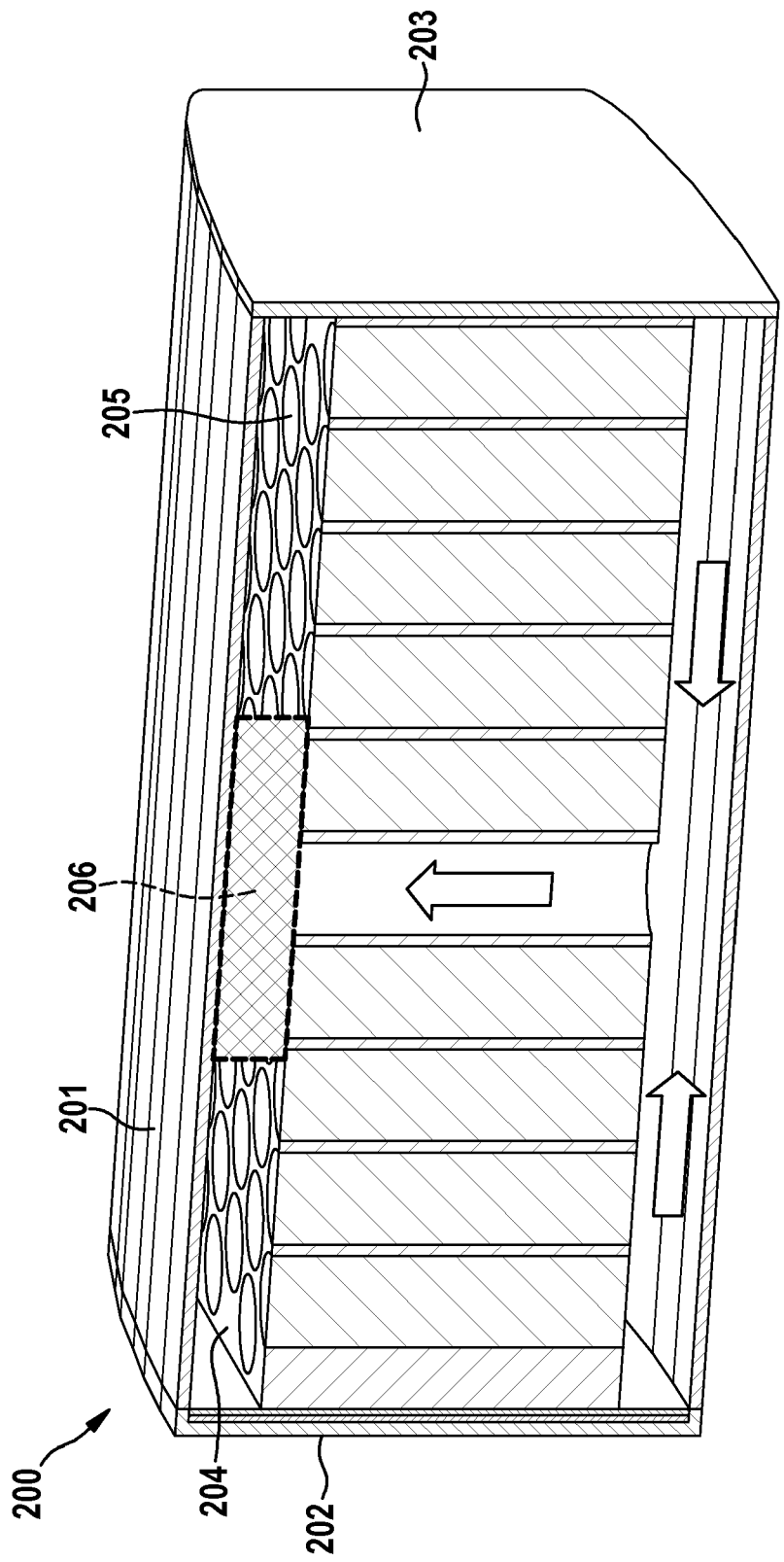
FIG. 2 shows a battery system including at least one blower, in accordance with an example embodiment of the present invention.

FIG. 2 shows a battery system 200 including a battery housing, which includes a base body 201, a first cover element 202, and a second cover element 203. First cover element 202 closes a first open end face of base body 201 and includes a battery management system, which is not shown here, and second cover element 203 closes a second open end face of base body 201. The battery housing thus forms a closed space which acts as an accommodating space for a battery cell holder 204. The battery housing is thus sealed or closed in an air-tight manner with respect to the surroundings. Battery cell holder 204 does not completely fill the accommodating space of the battery housing. This means that the battery housing and battery cell holder 204 are situated in parallel to the end faces spaced apart from one another. In other words, empty spaces or cavities are present above and beneath the battery cell holder accommodated in the battery housing. Battery cell holder 204 includes accommodating areas for a plurality of battery cells 205. The at least one blower 206 is situated between battery cell holder 204 and the battery housing. Blower 206 may, for example, be situated on battery cell holder 204 and is, for example, a radial blower. At least one accommodating area of battery cell holder 204 which is situated directly beneath the at least one blower does not include any battery cell or any battery cells. This means the accommodating area is empty and acts as an air intake area for blower 206. This allows the heat or warm air to be taken in by battery cell holder 204. A circulation of the warm air is made possible in that clearances are present for the air circulation between first cover element 202 and battery cell holder 204, as well as between battery cell holder 204 and second cover element 203, due to the damping materials situated in this location. In this way, blower 206 is able to generate a circulating air movement inside the battery housing. The air flow represents a pure circulation of the air present inside the battery. In this way, the warm air inside the battery is exchanged between areas having a higher temperature and those having a lower temperature, so that the different temperature areas inside the battery equalize. In other words, the waste heat of battery cells 205 is redistributed inside the battery. To be able to improve the distribution of the heat, additionally further accommodating areas of battery cell holder 204 are left exposed, i.e., no battery cells are inserted into these accommodating areas. These are accommodating areas, for example, which are spatially situated in the vicinity of blower 206. As an alternative or in addition, the battery cell holder may include air channels which are situated between the individual battery cells 205 in battery cell holder 204, so that an optimal flow around the individual battery cells 205 takes place. These air channels may also only be present at the locations of battery cell holder 204 at which the operating temperature of battery cells 205 is very high, for example in third temperature area 122 shown in FIG. 1. As an alternative or in addition, a further blower may be situated on second cover element 203.

Based on arrows, FIG. 2 shows the circulation inside the battery housing through battery cell holder 204 beneath blower 206. The temperatures inside the battery housing are, for example, detected with the aid of NTCs at different locations of the battery cell array. In the process, blower 206 is controlled by the battery management system as a function of the temperatures of battery cells 205 exceeding a threshold value. Due to the circulation, the air is conducted along the base body of the battery housing, so that the redistributed heat is passively released via the surface of the battery housing.

Base body 201 of the battery housing is designed in one piece and to be tubular and includes a metal. The metal may include aluminum or manganese, for example. Base body 201 may be manufactured with the aid of a continuous casting method.

The present invention may also be used at the module level, the battery cells to be replaced by battery modules. In the process, the blower is situated inside the individual battery modules, which each include a dedicated housing.

A further exemplary embodiment includes the installation of a blower at the battery pack level which homogenizes the temperature of the individual battery modules. In this case, the battery cell holder has to be replaced with an accommodating element for battery modules or be configured in such a way that it is able to accommodate battery modules.

The battery system is used, for example, in an electrically operated two-wheeler. The battery system may furthermore also be used in stationary devices, e.g., in domestic buffer stores.

Figure 3:
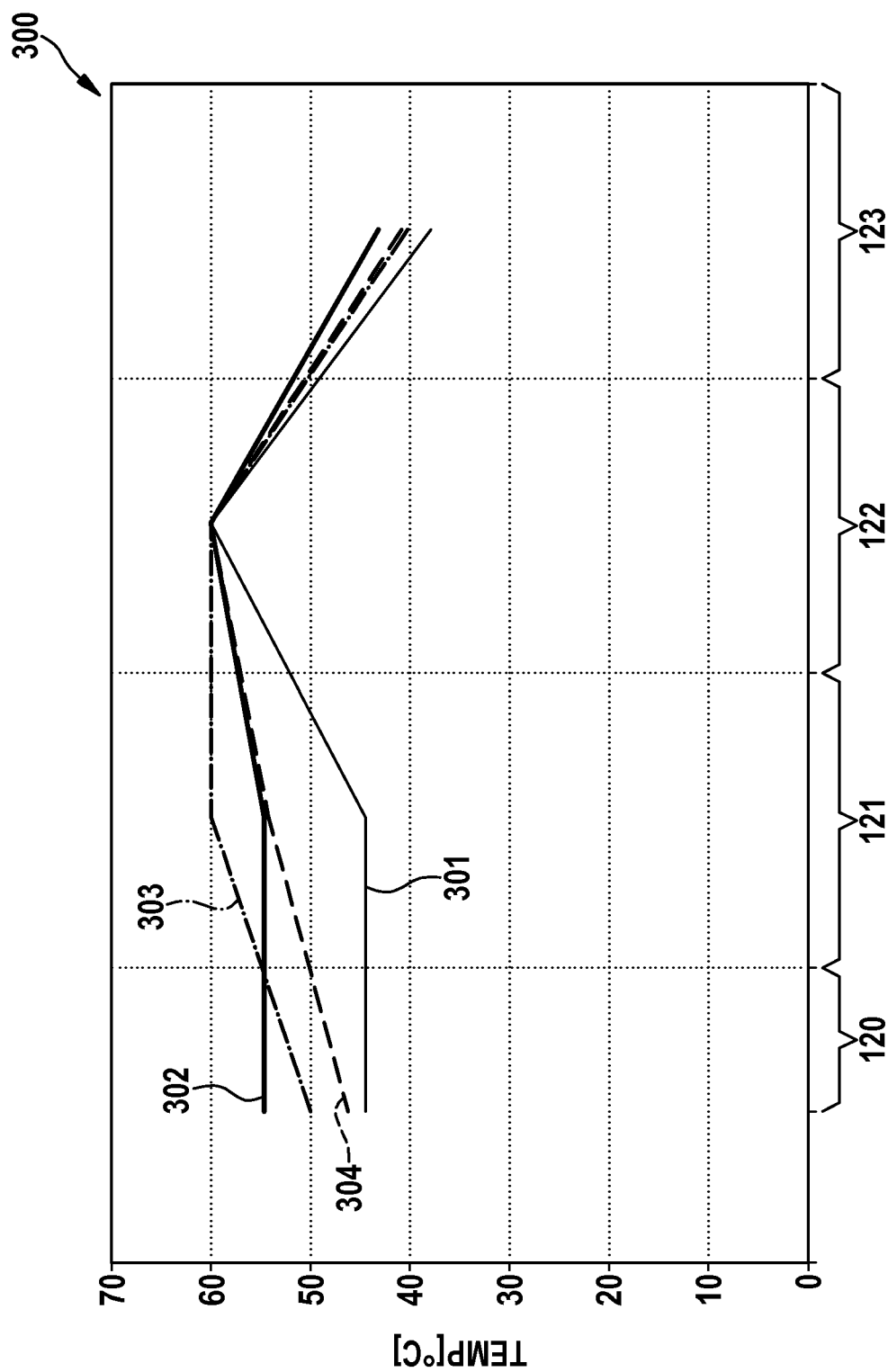
FIG. 3 shows a thermal behavior of a battery system according to an example embodiment of the present invention including a blower, the volume flows of the blower being different.

FIG. 3 shows the thermal behavior 300 of a battery system including a blower, the volume flows of the blower being different. The waste heat of each battery cell is approximately 1.36 W. Shown here is the operating state during a discharging process during which a temperature threshold value of 60° C. is reached or exceeded for the first time at one location of the battery. In general, this occurs in one of the centrally situated battery cells. FIG. 3 shows the thermal behavior of the temperature areas shown in FIG. 1, namely first temperature areas 120, second temperature area 121, third temperature area 122, and fourth temperature areas 123. The abscissa represents the individual temperature areas, and the ordinate represents the associated temperature values. A first curve 301 represents the thermal behavior of the battery without blower. A second curve 302 shows the thermal behavior of the battery including a blower which has a volume flow of 0.72 $m^3$/h. The curve progression in temperature areas 120 and 121 may be explained by the fact that the edge areas have already heated up due to the low volume flow of the blower when the battery center is 60° C. A third curve 303 shows the thermal behavior of the battery including a blower which has a volume flow of 3.18 $m^3$/h, and a fourth curve 304 shows the thermal behavior of the battery including a blower which has a volume flow of 9.6 $m^3$/h. The temperature differences inside the battery are thus reduced from 21.6 K to 16.4 K, i.e., a considerable homogenization of the temperature distribution exists inside the battery housing.

Figure 4:
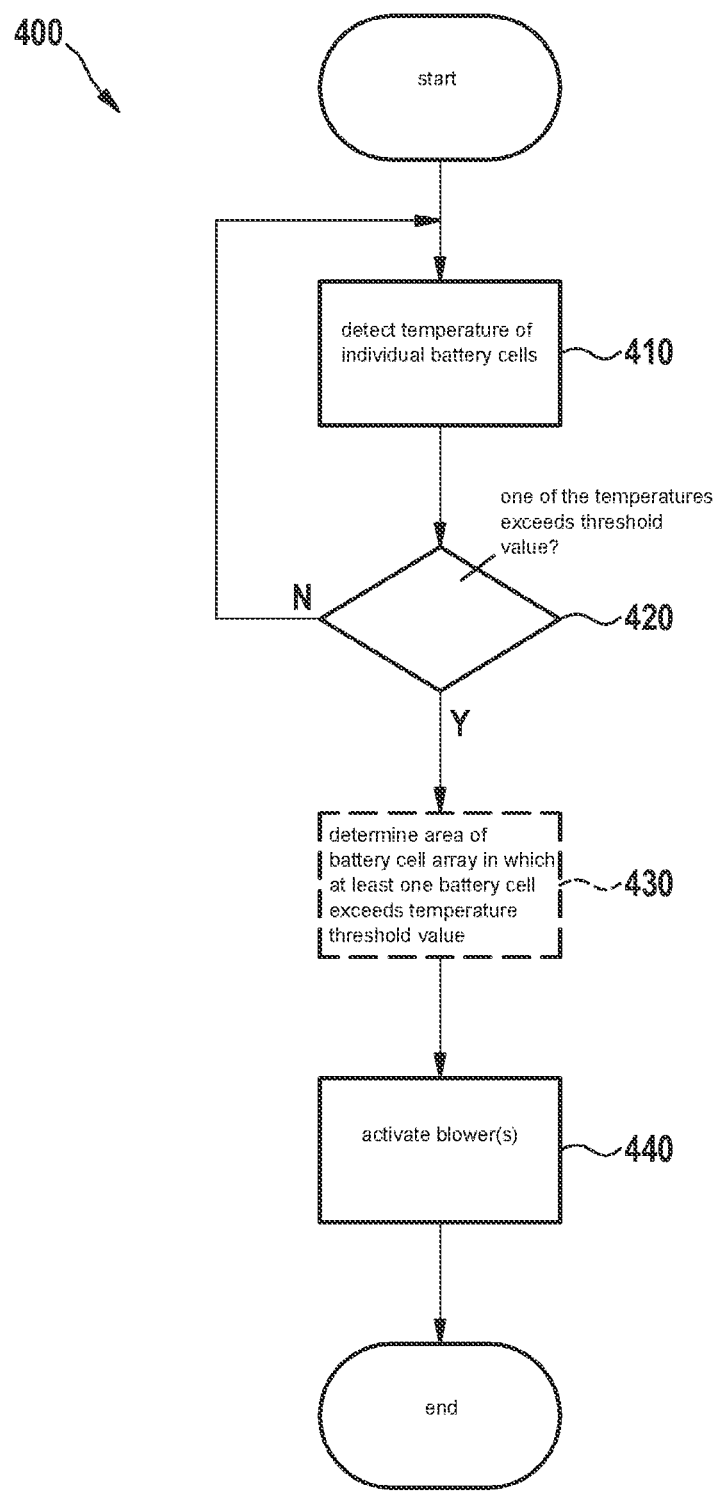
FIG. 4 shows a method for the homogeneous temperature distribution inside a battery system including at least one blower, in accordance with an example embodiment of the present invention.

FIG. 4 shows a method 400 for the homogeneous temperature distribution inside a battery system including at least one blower, the battery system including a battery housing, a battery cell holder including a plurality of battery cells which is situated inside the battery housing, and a battery management system which is configured to monitor the plurality of battery cells. In accordance with an example embodiment of the present invention, method 400 starts with step 410 in which the battery management system detects temperatures of the individual battery cells. In a subsequent step 420, it is checked whether one of the temperatures exceeds a certain threshold value. The predetermined threshold value is, for example, a maximum permissible operating temperature or limiting temperature of the battery cell predefined by the manufacturer of the battery cell. As an alternative, it may also be predefined by the battery system for the instantaneous operating state of the battery, i.e., charging or discharging. For the charging process, the particular threshold value is 40° C., and for the discharging process, the particular threshold value is approximately 60° C.

If the particular threshold value is reached, the at least one blower is activated in a subsequent step 440. If this is not the case, the method is continued with step 410.

If the battery system includes multiple blowers, the area of the battery cell array in which at least one battery cell exceeds the temperature threshold value is determined in a step 430, which follows step 420. In the following step 440, the blower or blowers situated closest to this affected area, or able to redistribute the waste heat the fastest, is/are activated. In the process, blowers are operated simultaneously both in the hotter areas and in the colder areas, so that a high temperature gradient arises, which results in a fast cooling or homogenization of the temperature distribution inside the battery system.

What is claimed is:
1. A battery system, comprising:
   a battery housing, which includes a base body, a first cover element, and a second cover element, the first cover element closing a first open end face of the base body, and the second cover element closing a second open end face of the base body;
   a battery cell holder which includes a plurality of battery cells, the battery cell holder being situated inside the battery housing;

a battery management system configured to monitor the plurality of battery cells and detect temperatures of individual battery cells of the battery cells; and a blower situated inside the battery housing on the battery cell holder;

wherein:
- the blower is activated by the battery management system as a function of at least one of the temperatures of the individual battery cells exceeding a threshold value;
- the battery housing includes an airflow area beneath the battery cell holder;
- the battery cell holder includes a first passage that, between at least two of the battery cells, extends from airflow area to the blower; and
- the blower is configured to blow air, which flows from in the airflow area to the blower via the passage, into a second passage that is above the battery cell holder.

2. The battery system as recited in claim 1, wherein the blower is situated between the battery housing and the battery cell holder.

3. The battery system as recited in claim 1, wherein the blower is a radial blower.

4. The battery system as recited in claim 1, wherein the second cover element includes at least one further blower.

5. The battery system as recited in claim 1, wherein the base body is a continuously cast element.

6. The battery system as recited in claim 1, wherein the battery housing includes aluminum.

7. The battery system as recited in claim 1, wherein the battery system is situated in an electrically operated two-wheeler.

8. A method for a homogeneous temperature distribution inside a battery system, the battery system including a battery housing, a battery cell holder including a plurality of battery cells which is situated inside the battery housing, and a battery management system which is configured to monitor the plurality of battery cells and detect temperatures of the individual battery cells of the plurality of battery cells, the method comprising:
- activating, by the battery management system and as a function of at least one of the temperatures of the individual battery cells exceeding a threshold value, a blower that is situated inside the battery housing on the battery cell holder;

wherein:
- the battery housing includes a base body, a first cover element closing a first open end face of the base body, and a second cover element closing a second open end face of the base body;
- the battery housing includes an airflow area beneath the battery cell holder;
- the battery cell holder includes a first passage that, between at least two of the battery cells, extends from airflow area to the blower; and
- the activating of the blower causes the blower to blow air, which flows from in the airflow area to the blower via the passage, into a second passage that is above the battery cell holder.

9. An electrically operated two-wheeler, comprising:

a battery system including:
- a battery housing, which includes a base body, a first cover element, and a second cover element, the first cover element closing a first open end face of the base body, and the second cover element closing a second open end face of the base body;
- a battery cell holder which includes a plurality of battery cells, the battery cell holder being situated inside the battery housing;
- a battery management system configured to monitor the plurality of battery cells and detect temperatures of individual battery cells of the battery cells;
- a blower situated inside the battery housing on the battery cell holder;

wherein:
- the blower is activated by the battery management system as a function of the temperatures of the individual battery cells exceeding a threshold value;
- the battery housing includes an airflow area beneath the battery cell holder;
- the battery cell holder includes a first passage that, between at least two of the battery cells, extends from airflow area to the blower; and
- the blower is configured to blow air, which flows from in the airflow area to the blower via the passage, into a second passage that is above the battery cell holder.

* * * * *